May 26, 1925.
C. S. JACKSON
AIR BRAKE MECHANISM
Filed Feb. 11, 1924
1,539,570
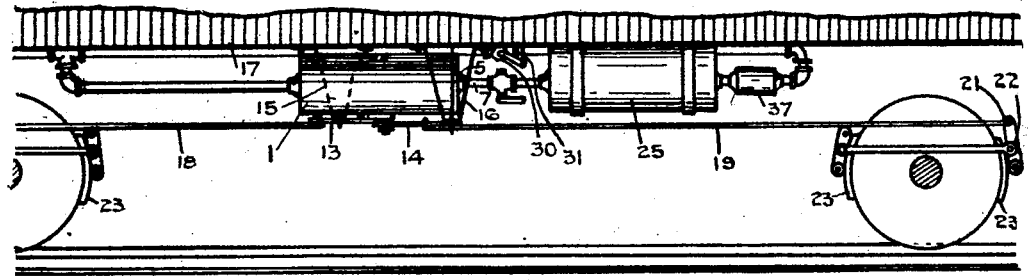
FIG-1.
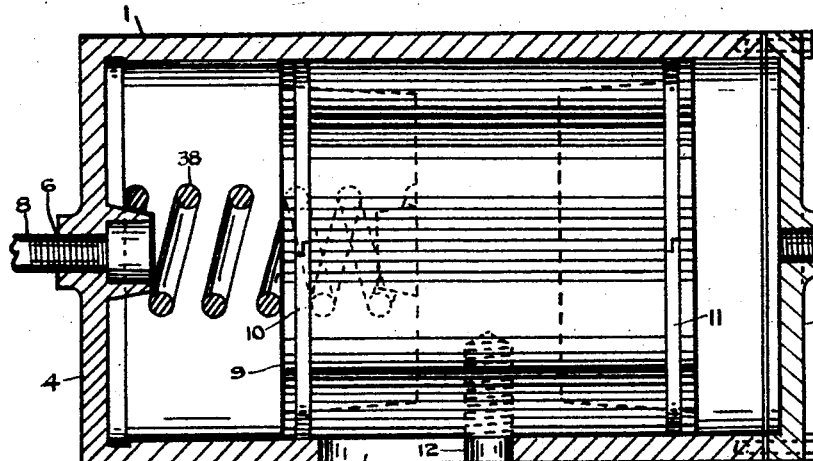
FIG-2.
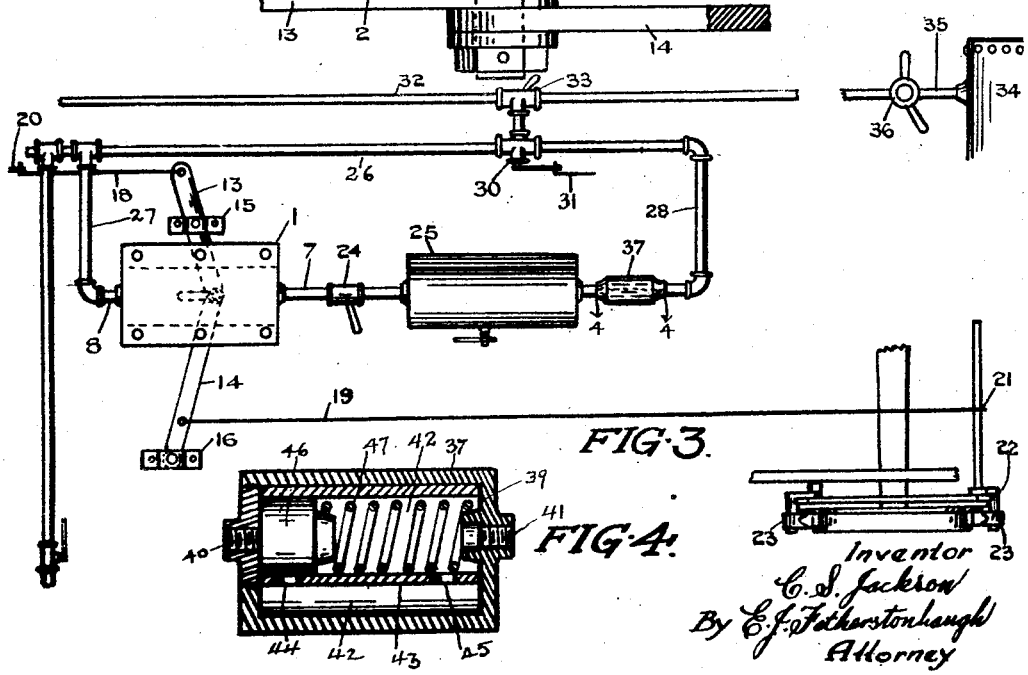
FIG-3.
FIG-4.
Inventor
C. S. Jackson
By E. J. Fatherstonhaugh
Attorney Patented May 26, 1925.

1,539,570

UNITED STATES PATENT OFFICE.

CHARLES SUMNER JACKSON, OF SHAWINIGAN FALLS, QUEBEC, CANADA, ASSIGNOR OF ONE-HALF TO FREDERICK STEWART BROWN, OF MONTREAL, QUEBEC, CANADA.

AIR-BRAKE MECHANISM.

Application filed February 11, 1924. Serial No. 692,010.

*To all whom it may concern:*

Be it known that I, CHARLES SUMNER JACKSON, a citizen of the United States of America, and residing at the town of Shawinigan Falls, in the Province of Quebec, in the Dominion of Canada, have invented a new and useful Air-Brake Mechanism, of which the following is the specification.

The invention relates to an air brake mechanism as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to simplify the application of the brakes of a car or other vehicle in air brake systems; to economize in regard to the volume of compressed air used up in the many operations to effect an instantaneous application and a quick release of the brakes; to centralize the exhaust of air incidental to the application and generally to provide an efficient, durable, and serviceable air brake mechanism.

In the drawings, Figure 1 is a side elevation of the air operating valve, showing the connection to the brake shoes.

Figure 2 is an enlarged longitudinal sectional view of the valve cylinder and connections.

Figure 3 is a plan view of the mechanism showing the connections to the brake levers.

Figure 4 is a sectional detail of reservoir control valve.

Like numerals of reference indicate corresponding parts in the various figures.

Referring to the drawings, the valve cylinder 1 is formed with a longitudinal pin slot 2 centrally arranged between the heads 3 and 4, the latter having air ports 5 and 6 in which the air pipes 7 and 8 are secured.

The piston 9 operates in the cylinder 1 and is of sufficient length to keep the pin slot 2 continuously covered notwithstanding the forward and return stroke of said piston, the latter having the piston rings 10 and 11 in corresponding grooves and always beyond the ends of the pin slot 2 no matter what the position of the piston may be.

The pin 12 is secured to the piston 9 through the slot 2 and at its upper end forms a pivot bearing for the inner ends of the rocker arms 13 and 14.

The rocker arms 13 and 14 are pivotally mounted on the bearings 15 and 16 rigid with the car body 17 and the outer ends of the said rocker arms are pivotally secured to the reach rods 18 and 19 respectively.

The reach rods at their far ends are pivotally secured to the brake levers 20 and 21 and the latter are operatively connected to the brake beams and shoes 22 and 23 so that any movement of said reach rods forward or return at once affects the brake levers for the application or release of the brakes.

The cylinder 1 is connected through the pipes 7 and cut off valve 24 to the compressed air reservoir 25 and through the pipe 8 to the operating line of piping formed of the longitudinal section 26 and the end sections 27 and 28, the latter being connected to the opposite end of the reservoir 25 said piping 26 between the end section 27 and end section 28 having an emergency valve 30 operable from the car by the rod 31. The longitudinal section 26 is connected to the train line air supply piping 32 through the cut off valve 33, said train line 32 leading from the main reservoir 34, which in steam railways is situated in the locomotive and in the connection 35 between this reservoir 34 and the train line, the three way valve 36 is located.

The spring held valve 37 is secured at the outer end port of the reservoir 25 and the spring 38 is introduced in the outer end of the cylinder 1 between the head 4 and piston 9 to normally maintain the latter towards the head 3. The spring valve 37 is formed of a casing having the cylindrical chamber 39 and the inlet 40 and outlet 41, the latter leading to the inlet of the reservoir 25.

At one side of said casing the by-pass 42 extends for the full length of the cylindrical chamber 39 and is separated therefrom by the wall 43 having the ports 44 and 45 at the inlet and outlet end respectively.

The valve 46 operates in the cylindrical chamber 39 over the port 44 and is normally held by the spring 47 to close said port 44 and is opened by the pressure of air from the train line during the operation of filling the reservoir.

In the operation of the invention the valve 36 is in the first place turned to permit the flow of compressed air from the main reservoir to the train line of piping forming the principal channel for the passage of air to operate the air brake systems installed in the several cars of a train. Each car equipment of air brake mechanism is constantly connected with the train line piping and while cutoffs are provided they are only used during repairs or replacements, therefore the compressed air will flow into and through the piping of each car equipment and charge the reservoir 25, besides flowing into the outer end of the cylinder 1, and thereby assisting the spring in maintaining the piston normally adjacent to the head 3.

In this condition the mechanism is balanced and the brakes hang loose, but the moment an exhaust of air occurs through the three way valve 36, the pressure is relieved from the train line and correspondingly relieved in the circuit piping of each car. This relief immediately takes considerable pressure from the outer side of the piston with the result that the pressure from the reservoir 25 overbalances the pressure of the spring 38 and moves the piston in said cylinder 1.

As the piston moves it carries the pin 12 and this through the rocker arms moves the reach rods 18 and 19 to apply the brake shoes to the wheels.

The return of pressure in the train line at once fills up the pipe circuits in the car equipments and reestablishes the pressure in the outer end of the cylinder 1 and with the spring forces the air back to the reservoir 25, where any loss is immediately made good from the circuit pipes.

It will be seen that the loss of air in this system is negligible, for where there are several equipments in use the relief may be accomplished at a main supply tank and affect every equipment equally.

It must be particularly emphasized that owing to the balanced pressure the brake shoes are steadily and firmly applied and not hammered to the wheel, consequently both in the emergency and service application the shoes will gradually yet quickly come to engagement with the wheels, thereby eliminating the troubles usually due to rough application and the resulting flat wheels. Further the absence of the noise caused by the hissing of the escaping air under the car is a great comfort to passengers as well as economy as mentioned hereinbefore.

The skidding incident to the flat wheels is thus avoided and many troubles are absent such as leaky cylinders and complicated connecting rods and mechanism.

What I claim is:—

1. An air brake mechanism comprising a cylinder having a longitudinal pin slot in the wall thereof, a piston reciprocating in said cylinder and constantly closing said slot and a pin projecting outwardly through said slot from said piston, an accompanying air reservoir constantly connected to and communicating with said cylinder, a pipe line circuit including said cylinder and reservoir, and connected to a source of compressed air, a reservoir control valve, a main control valve and levers and reach rods connecting said pin with the brake levers.

2. An air brake mechanism comprising a cylinder having air ports through the heads thereof and a pin slot through the wall and adapted to be secured to the car body, a piston reciprocating in said cylinder and constantly closing said slot and a pin projecting outwardly through said slot from said piston, an accompanying air reservoir constantly connected to and communicating with said cylinder, a pipe line circuit including said cylinder and reservoir, and connected to a source of compressed air, a reservoir control valve, a main control valve and levers and reach rods connecting said pin with the brake levers.

3. An air brake mechanism comprising a cylinder having end ports in the heads and pipe connections from said ports and a central longitudinal slot of approximately one quarter the length of the complete cylinder, a piston reciprocating in said cylinder and having a pin projection extending through said slot, an accompanying air reservoir constantly connected to and communicating with said cylinder, a pipe line circuit including said cylinder and reservoir, and connected to a source of compressed air, a reservoir control valve, a main control valve, and levers and reach rods connecting said pin with the brake levers.

4. An air brake mechanism comprising a cylinder having a longitudinal pin slot in the wall thereof, a piston constantly closing said slot during reciprocation in said cylinder and having piston rings in corresponding grooves always beyond the ends of said slot, a spring introduced in said cylinder between said piston and the outer cylinder head, a pin projecting outwardly through said slot, an accompanying air reservoir constantly connected to and communicating with said cylinder, a pipe line circuit including said cylinder and reservoir, and connected to a source of compressed air, a reservoir control valve, a main control valve, and levers and reach rods connecting said pin with the brake levers.

5. An air brake mechanism comprising a cylinder having a longitudinal pin slot in the wall thereof, a piston reciprocating in said cylinder and constantly closing said slot and a pin projecting outwardly through said slot from said piston, an accompanying air reservoir constantly connected to and communicating with said cylinder, a pipe line circuit including said cylinder and reservoir and connected to a source of compressed air, a reservoir control valve, a main control valve, and levers pivotally mounted on said pins and on pivots from the car body and connected by reach rods to the brake levers.

6. An air brake mechanism comprising a cylinder having a longitudinal pin slot in the wall thereof, a piston reciprocating in said cylinder and constantly closing said slot and a pin projecting outwardly through said slot from said piston, an accompanying air reservoir constantly connected to and communicating with said cylinder, a pipe line circuit including said cylinder and reservoir and connected to a source of compressed air, a reservoir control valve, a main control valve, and levers at one end pivotally mounted on said pin and extending outwardly therefrom in opposite directions, an intermediate pivotal mounting for each of said levers and reach rods extending in opposite directions from said levers respectively to brake mechanisms.

7. In an air brake mechanism, a cylinder containing an operating piston having a connection pin projecting therefrom through a slot in said cylinder, a lever in the form of a rocker arm pivotally secured to said pin, a reach rod to a brake lever, a circuit of piping, and a source of supply of compressed air.

8. In devices operated by expansible fluid, a cylinder and fluid tank suitably connected, a piston operating in said cylinder and having a connection pin therefrom extending outwardly through an elongated slot in the wall of said cylinder, valves controlling the flow of said fluid, and connections pivotally secured and extending from said pin.

Signed at Montreal, this 28th day of January 1924.

CHARLES SUMNER JACKSON.